United States Patent
Zhu

(10) Patent No.: US 11,539,471 B2
(45) Date of Patent: Dec. 27, 2022

(54) HYBRID AUTOMATIC REPEAT REQUEST FEEDBACK INDICATION AND FEEDBACK METHOD, APPARATUS AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 62 days.

(21) Appl. No.: 16/874,657

(22) Filed: May 14, 2020

(65) Prior Publication Data

US 2020/0274650 A1   Aug. 27, 2020

Related U.S. Application Data

(63) Continuation of application No. PCT/CN2017/111689, filed on Nov. 17, 2017.

(51) Int. Cl.
| | | |
|---|---|---|
| *H04W 56/00* | (2009.01) | |
| *H04L 1/18* | (2006.01) | |
| *H04W 76/27* | (2018.01) | |
| *H04W 72/04* | (2009.01) | |
| *H04W 80/02* | (2009.01) | |

(52) U.S. Cl.
CPC ......... *H04L 1/1819* (2013.01); *H04W 72/042* (2013.01); *H04W 72/0446* (2013.01); *H04W 76/27* (2018.02); *H04W 80/02* (2013.01)

(58) Field of Classification Search
CPC .. H04L 1/1819; H04W 76/27; H04W 72/042; H04W 72/0446; H04W 80/02

USPC .......................................................... 370/329
See application file for complete search history.

(56) References Cited

U.S. PATENT DOCUMENTS

| 2002/0081995 A1* | 6/2002 | Leppinen .............. H04L 29/06 380/239 |
| 2012/0230273 A1 | 9/2012 | He et al. |
| 2014/0177491 A1* | 6/2014 | Hao ...................... H04L 1/1864 370/280 |

(Continued)

FOREIGN PATENT DOCUMENTS

| CN | 102237927 A | 11/2011 |
| CN | 102684855 A | 9/2012 |

(Continued)

OTHER PUBLICATIONS

ZTE, ZTE Microelectronics, NR HARQ timing indication scheme, 3GPP Draft; R1-1704378 NR HARQ timing indication scheme, Apr. 2, 2017, 3rd Generation Partnership Project (3GPP), Mobile Competence Centre ; 650, route des Lucioles; F-06921 Sophia-Antipolis Cedex ; France, vol. RAN WG1, Nr: Spokane, USA; Apr. 3-Apr. 7, 2017, 4 pages.

(Continued)

*Primary Examiner* — Sai Ming Chan
(74) *Attorney, Agent, or Firm* — Arch & Lake LLP

(57) ABSTRACT

A HARQ feedback indication method includes: configuring to control information a timing relationship between a time domain unit of downlink data and a time domain unit for an uplink HARQ feedback of the downlink data; and sending to a terminal the downlink data and the control information configured with timing information.

12 Claims, 7 Drawing Sheets

Configure in Control Information Timing Relationship Between Time Domain Unit of Downlink Data and Time Domain Unit for Uplink HARQ Feedback of Downlink Data — S101

Send to Terminal Downlink Data and Control Information Configured with Timing Information — S102

(56) References Cited

U.S. PATENT DOCUMENTS

| | | | | |
|---|---|---|---|---|
| 2016/0205679 A1* | 7/2016 | Yoo | ................... | H04W 72/042 370/329 |
| 2017/0373801 A1* | 12/2017 | Bergström | ............ | H04L 1/1628 |
| 2020/0022175 A1* | 1/2020 | Xiong | ............... | H04W 72/0453 |

FOREIGN PATENT DOCUMENTS

| | | | |
|---|---|---|---|
| CN | 104144509 | A | 11/2014 |
| CN | 105099633 | A | 11/2015 |
| CN | 106301699 | A | 1/2017 |
| CN | 107332646 | A | 11/2017 |
| EP | 2615882 | A1 | 7/2013 |
| WO | 2008131971 | A1 | 11/2008 |
| WO | 2017052437 | A1 | 3/2017 |
| WO | 2017113339 | A1 | 7/2017 |

OTHER PUBLICATIONS

Huawei, HiSilicon, Discussion on timing relations and signaling of HARQ timing for NR, 3GPP Draft; R1-1611218, Nov. 13, 2016, 3rd Generation Partnership Project (3GPP), Mobile Competence Centre ; 650, route des Lucioles ; F-06921 Sophia-Antipolis Cedex ; France, vol. RAN WG1, Nr: Reno, USA; Nov. 14-Nov. 18, 2016, 4 pages.

Huawei, HiSilicon, Discussion on timing relations for NR, 3GPP Draft; R1-1608839, Oct. 1, 2016, 3rd Generation Partnership Project (3GPP), Mobile Competence Centre ; 650, route des Lucioles ; F-06921 Sophia-Antipolis Cedex; France, vol. RAN WG1, NR: Lisbon, Portugal; Oct. 10-Oct. 14, 2016, 5 pages.

LG Electronics, Consideration on HARQ-ACK feedback timing for NR, 3GPP Draft; R1-1710332 NR HARQ-ACK timing final, Jun. 26, 2017, 3rd Generation Partnership Project (3GPP), Mobile Competence Centre ; 650, route des Lucioles; F-06921 Sophia-Antipolis Cedex; France, vol. RAN WG1, NR: Qingdao, P.R. China; Jun. 27-Jun. 30, 2017, 5 pages.

European Search Report issued in EP17931998.3, dated Oct. 26, 2020, 11 pages.

International Search Report issued to PCT Application No. PCT/CN2017/111689 dated Jul. 31, 2018, (4p).

First Office Action to Chinese Patent Application No. 201780001890.X dated Mar. 14, 2019 with English translation, (25p).

Samsung, "TDD DL HARQ-ACK Feedback Procedure for Latency Reduction With Subframe TTI", R1-166697—3GPP TSG RAN WG1 Meeting #86, Gothenburg, Sweden, Aug. 22-26, 2016, (4p).

Catt, "Discussion on DL/UL Scheduling and HARQ Management", R1-1715825—3GPP TSG RAN WG1 Meeting AH_#NR3, Nagoya, Japan, Sep. 18-21, 2017, (7p).

LG Electronics, "Discussion on HARQ Timing and Resource for NR", R1-1611845—3GPP TSG RAN WG1 Meeting #87, Reno, USA, Nov. 14-18, 2016, (6p).

* cited by examiner

HYBRID AUTOMATIC REPEAT REQUEST FEEDBACK INDICATION AND FEEDBACK METHOD, APPARATUS AND BASE STATION

CROSS-REFERENCE TO RELATED APPLICATIONS

This application is based upon and claims priority to PCT patent application No. PCT/CN2017/111689, filed on Nov. 17, 2017, the entire contents of which are incorporated herein by reference.

TECHNICAL FIELD

The present disclosure relates to the field of communication technology, and in particular, to a hybrid automatic repeat request (HARQ) feedback indication method, a HARQ feedback method, an apparatus, a base station, a user equipment and a computer-readable storage medium.

BACKGROUND

Continuous emergence of new Internet applications such as Augmented Reality (abbreviated to AR), Virtual Reality (abbreviated to VR) and vehicle-to-vehicle communication has placed relatively high requirements on wireless communication technology, driving wireless communication technology continue to evolve to meet needs of applications. At present, the cellular mobile communication technology is in an evolution stage of a new generation technology. An important feature of the new generation technology is to support flexible configurations of multiple service types. Because different service types have different requirements for wireless communication technologies, for example, requirements of enhanced Mobile Broad Band (abbreviated to eMBB) service types lay emphasis on aspects of large bandwidths, high speeds and the like, main requirements of Ultra Reliable Low Latency Communication (abbreviated to URLLC) service types lay emphasis on aspects of relatively high reliability and low latency, and main requirements for mass Machine Type Communication (abbreviated to mMTC) service types lay emphasis on aspects of large connections, a new generation of wireless communication systems need flexible and configurable designs to support transmission of multiple service types.

In a wireless communication system, the time-varying characteristics and multi-path fading of a wireless channel may affect transmission of signals, resulting in data transmission failure. In order to solve this problem, in a traditional wireless communication system, a Hybrid Automatic Repeat reQuest (abbreviated to HARQ) mechanism is introduced, through the feedback of the receiving side on whether the data is received correctly or not, the sending side determines whether it is necessary to re-send the sent packet. In a traditional Long-Term Evolution (LTE) system, there is a timing relationship between the time of transmission of data and the time of acknowledgement (ACK) feedback or non-acknowledgement (NACK) feedback. Limited by processing capabilities of terminals, in the LTE, there is at least 4 milli-seconds (ms) between the time of transmission of data and the time of ACK feedback or NACK feedback. In the LTE system, a HARQ feedback of a downlink data packet is synchronous, that is, there is a fixed timing relationship between the transmission of a downlink data packet and the uplink ACK feedback or NACK feedback for the data packet. The HARQ feedback of the uplink data packet may be synchronous or asynchronous.

With enhancement on terminal capabilities, the terminal may have relatively strong processing capabilities. In this case, the terminal may perform ACK or NACK feedback relatively fast on received data, to reduce latency of data transmission, which is important for some services, such as URLLC services, that have relatively high requirements on latency.

SUMMARY

In view of this, the present application discloses a HARQ feedback indication method, a HARQ feedback method and an apparatus, a base station, a user equipment and a computer-readable storage medium, to support dynamic HARQ feedback.

According to a first aspect of embodiments of the present disclosure, there is provided a hybrid automatic repeat request HARQ feedback indication method, applied to a base station, the method including:

configuring a timing relationship between a time domain unit where downlink data is configured and a time domain unit for an uplink HARQ feedback of the downlink data in control information; and sending the downlink data and the control information configured with the timing relationship to a terminal.

According to a second aspect of embodiments of the present disclosure, there is provided a hybrid automatic repeat request HARQ feedback method, applied to a terminal, the method including:

receiving downlink data sent by a base station and control information configured with a timing relationship between a time domain unit where the downlink data is configured and a time domain unit for an uplink HARQ feedback of the downlink data sent by the base station;

parsing the timing relationship from the control information; and sending, according to the timing relationship and the time domain unit where the downlink data is configured, uplink HARQ feedback information of the downlink data to the base station in a corresponding time domain unit.

According to a third aspect of embodiments of the present disclosure, there is provided a hybrid automatic repeat request HARQ feedback method, applied to a base station, the method including:

receiving uplink data sent by a terminal; and sending downlink HARQ feedback information of the uplink data to the terminal in one or more time domain units next to a unit for receiving the uplink data sent by the terminal.

According to a fourth aspect of embodiments of the present disclosure, there is provided a hybrid automatic repeat request HARQ feedback indication apparatus, applied to a base station, the apparatus including:

an adding module, configured to configure a timing relationship between a time domain unit where downlink data is configured and a time domain unit for an uplink HARQ feedback of the downlink data in control information; and a first sending module, configured to send the downlink data and the control information configured with the timing relationship by the adding module to the terminal.

According to a fifth aspect of embodiments of the present disclosure, there is provided a hybrid automatic repeat request HARQ feedback apparatus, applied to a terminal, the apparatus including:

a first receiving module, configured to receive downlink data sent by a base station and control information configured with a timing relationship between a time domain unit where the downlink data is configured and a time domain unit for an uplink HARQ feedback for the downlink data sent by the base station;

a parsing module, configured to parse the timing relationship from the control information received by the first receiving module; and a third sending module, configured to send, according to the timing relationship parsed by the parsing module and time domain unit where the downlink data is configured, uplink HARQ feedback information of the configured downlink data to the base station in a corresponding time domain unit.

According to a sixth aspect of embodiments of the present disclosure, there is provided a hybrid automatic repeat request HARQ feedback apparatus, applied to a base station, the apparatus including:

a third receiving module, configured to receive uplink data sent by a terminal; and a fourth sending module, configured to send downlink HARQ feedback information of the uplink data received by the third receiving module to the terminal in one or more time domain units next to a unit for receiving the uplink data sent by the terminal.

According to a seventh aspect of embodiments of the present disclosure, there is provided a base station, including:

a processor; and a memory for storing instructions executable by the processor;

where the processor is configured to:

configure a timing relationship between a time domain unit where downlink data is configured and a time domain unit for an uplink HARQ feedback of the downlink data in control information; and send the downlink data and the control information configured with the timing relationship to a terminal.

According to an eighth aspect of embodiments of the present disclosure, there is provided a user equipment, including:

a processor; and a memory for storing instructions executable by the processor;

where the processor is configured to:

receive downlink data sent by a base station and control information configured with a timing relationship between a time domain unit where the downlink data is configured and a time domain unit for an uplink HARQ feedback of the downlink data sent by the base station;

parse the timing relationship from the control information; and send, according to the timing relationship and the time domain unit where the downlink data is configured, uplink HARQ feedback information of the downlink data to the base station in a corresponding time domain unit.

According to a ninth aspect of embodiments of the present disclosure, there is provided a base station, including:

a processor; and a memory for storing instructions executable by the processor;

where the processor is configured to:

receive uplink data sent by a terminal;

send downlink HARQ feedback information of the uplink data to the terminal in one or more time domain units next to a unit for receiving the uplink data sent by the terminal.

According to a tenth aspect of embodiments of the present disclosure, there is provided a non-transitory computer-readable storage medium, a computer instruction is stored thereon, and when the instruction is executed by a processor of a terminal, operations of the hybrid automatic repeat request HARQ feedback indication method described above are implemented.

According to an eleventh aspect of embodiments of the present disclosure, there is provided a non-transitory computer-readable storage medium, a computer instruction being stored thereon, and when the instruction being executed by a processor of a terminal, operations of the hybrid automatic repeat request HARQ feedback method described above being implemented.

According to a twelfth aspect of embodiments of the present disclosure, there is provided a non-transitory computer-readable storage medium, a computer instruction being stored thereon, and when the instruction being executed by a processor of a terminal, operations of the hybrid automatic repeat request HARQ feedback method described above being implemented.

It should be understood that above general descriptions and the following detailed descriptions are merely exemplary and explanatory, and should not limit the present disclosure.

BRIEF DESCRIPTION OF THE DRAWINGS

The accompanying drawings herein are incorporated into the specification and constitute a part of the present specification, illustrate embodiments conforming to the present disclosure, and serve to explain principles of the present disclosure in conjunction with the specification.

DETAILED DESCRIPTION

Exemplary embodiments will be described in detail herein, examples of which are illustrated in the accompanying drawings. When the following description refers to the accompanying drawings, unless other indicated, the same numbers in different accompanying drawings indicate the same or similar elements. The embodiments described in the following exemplary embodiments do not represent all embodiments consistent with the present disclosure. Instead, they are merely examples of apparatus and methods consistent with aspects as detailed in the appended claims of the present disclosure.

Figure 1:
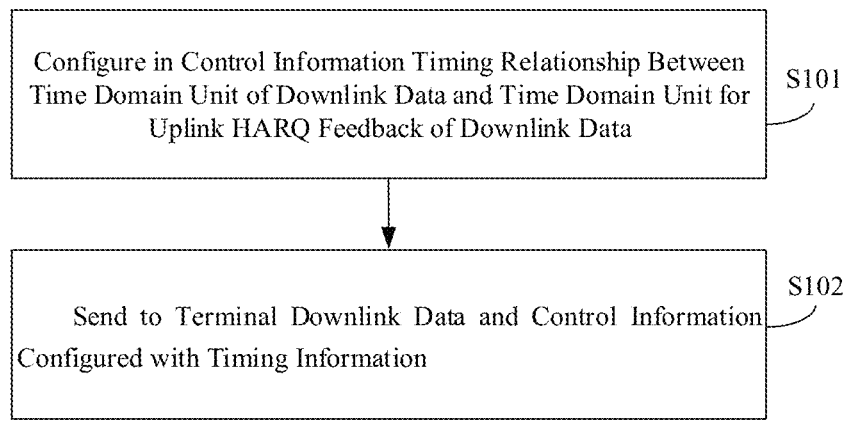
FIG. 1 is a flowchart of a HARQ feedback indication method according to an exemplary embodiment of the present application.

FIG. 1 is a flowchart of a HARQ feedback indication method according to an exemplary embodiment of the present application, the embodiment is described from the base station side, and the embodiment describes the HARQ feedback indication method using uplink feedback of downlink data as an example. As shown in FIG. 1, the HARQ feedback indication method includes the following.

In operation S101, a timing relationship between a time domain unit where downlink data is configured and a time domain unit for an uplink HARQ feedback of the downlink data is configured in control information.

In one embodiment, the control information may include, but is not limited to, radio resource control (RRC) signaling, media access control (MAC) control element (CE), or physical layer signaling and the like, where the physical layer signaling includes downlink control information (DCI).

When the control information is DCI, the above timing relationship may be configured in an information domain of the DCI, and the information domain may be configured at a fixed location or a configurable location in the DCI. When the location of the information domain is configurable, a base station may notify a terminal of the location of the information domain via RRC signaling, MAC CE or physical layer signaling and the like. Moreover, a length of the information domain may be fixed, and also may be pre-determined with the terminal, and still also may be configurable. If the length of the information domain is configurable, the base station may notify the terminal of the length of the information domain via RRC signaling, MAC CE or physical layer signaling and the like.

When the control information is signaling, the signaling may include RRC signaling, MAC CE or physical layer signaling. At this time, the timing relationship may be one value, for example, two symbols or four symbols, and may also be multiple values, for example, two symbols, three symbols and four symbols.

When the control information is DCI, the method may further include: sending signaling which is used for triggering dynamic HARQ feedback to the terminal, so that the terminal may trigger the dynamic HARQ feedback based on the signaling. Where the signaling used to trigger dynamic HARQ feedback may include RRC signaling, MAC CE or physical layer signaling.

In this embodiment, the timing relationship may be configured in different control information, and the implementation manner is flexible and diverse.

In operation S102, the downlink data and the control information configured with the timing relationship are sent to the terminal.

In this embodiment, after configuring the timing relationship in the control information, the downlink data and the control information configured with the above timing information may be sent to the terminal. After receiving the control information, the terminal may send uplink HARQ feedback information of the downlink data to the base station in a corresponding time domain unit according to the timing relationship and the time domain unit where the downlink data is configured, so as to implement a dynamic HARQ feedback.

In the above described embodiments, through that the timing relationship between the time domain unit where the downlink data is configured and the time domain unit of the uplink HARQ feedback of the downlink data is configured in the control information, and the downlink data and the control information configured with timing information is sent to the terminal, the terminal may send uplink HARQ feedback information of the downlink data to the base station according to the timing relationship, thereby implementing a dynamic HARQ feedback.

Figure 2:
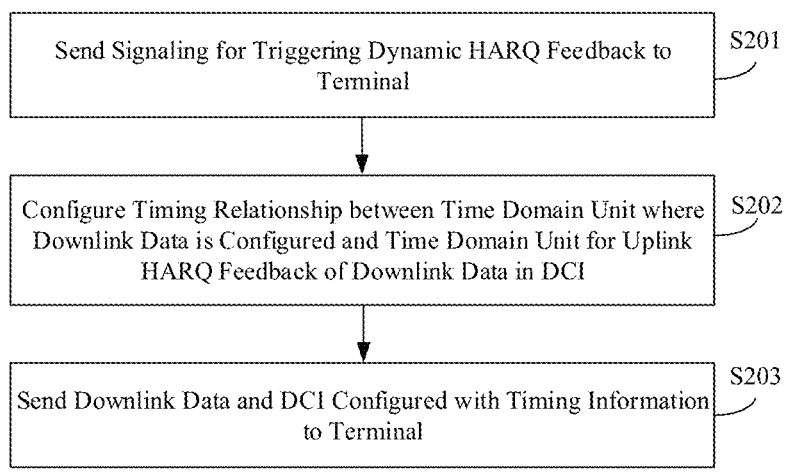
FIG. 2 is a flowchart of another HARQ feedback indication method according to an exemplary embodiment of the present application.

FIG. 2 is a flowchart of another HARQ feedback indication method according to an exemplary embodiment of the present application. As shown in FIG. 2, the HARQ feedback indication method includes the following.

In operation S201, sending signaling for triggering dynamic HARQ feedback to a terminal.

Where the signaling for triggering dynamic HARQ feedback may include RRC signaling, MAC CE or physical layer signaling.

In the embodiment, before a base station sending the signaling for triggering the dynamic HARQ feedback to the terminal, a default timing relationship between a time domain unit where the downlink data is configured and a time domain unit for an uplink HARQ feedback of the downlink data may also be defined in advance, alternatively, the default timing relationship is carried in RRC signaling, MAC CE or physical layer signaling to be notified to the terminal.

In the embodiment, there are a plurality of trigger conditions on which the base station sends signaling to the terminal for triggering dynamic HARQ feedback. For example, the base station has detected that the service was switched to a preset type service. For another example, the base station receives the service information reported by the terminal, and determines that the service is switched to a preset type service according to the service information, where the preset type service may include, but are not limited to, low-latency service.

It should be noted that the trigger conditions listed above are only examples. In actual applications, there may also be other trigger conditions.

In operation S202, a timing relationship between a time domain unit where downlink data is configured and a time domain unit for an uplink HARQ feedback of downlink data is configured in the DCI.

Where the timing relationship may be configured in the DCI as well as other control information. The DCI listed here is only an example.

In operation S203, the downlink data and the DCI configured with the above timing information to the terminal are sent.

Where operation S201 and operations S202 to S203 have no strict sequential relationship, that is, operation S201 may be performed first, and then operations S202 to S203 may be performed, or operations S202 to S203 may be performed first, and then operation S201 may be performed.

In the above described embodiments, through sending signaling for triggering dynamic HARQ feedback to the terminal and sending the downlink data and DCI with timing information configured in the terminal, the terminal may a trigger dynamic HARQ feedback based on the signaling.

Figure 3:
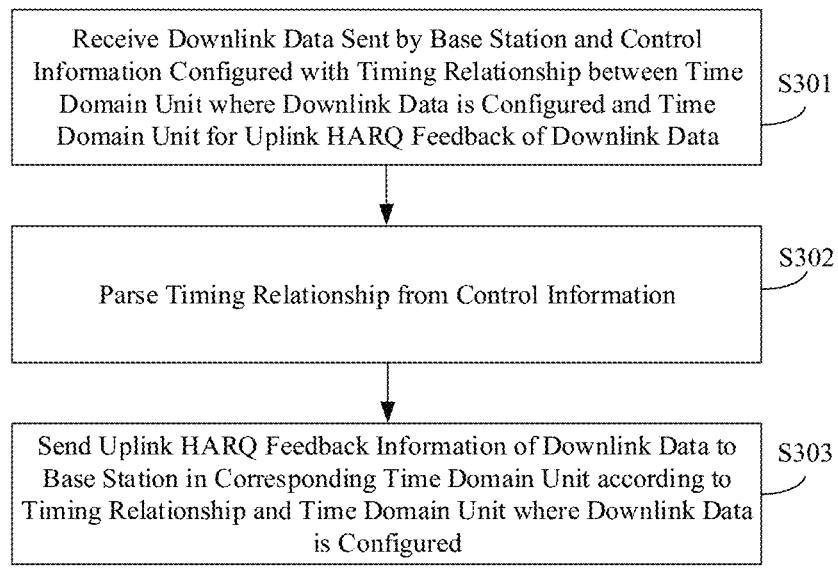
FIG. 3 is a flowchart of a HARQ feedback method according to an exemplary embodiment of the present application.

FIG. 3 is a flowchart of a HARQ feedback method according to an exemplary embodiment of the present application. This embodiment is described from a terminal side. As shown in FIG. 3, the HARQ feedback method includes the following.

In operation S301, downlink data sent by a base station and control information configured with a timing relationship between a time domain unit where the downlink data is configured and a time domain unit for an uplink HARQ feedback of the downlink data sent by the base station are received.

Where, the control information may include, but is not limited to, downlink control information (DCI), radio resource control (RRC) signaling, media access control (MAC) control element (CE), or physical layer signaling and the like.

In operation S302, the timing relationship from the control information is parsed.

When the control information is DCI, the timing relationship is configured in an information domain of the DCI, and the information domain is in a fixed or configurable location in the DCI, and the length of the information domain is fixed or configurable, the terminal may detect the information domain of the fixed length or the configurable length at the fixed location in the DCI, to obtain the timing relationship.

When the control information is RRC signaling, MAC CE or physical layer signaling, the terminal may parse the timing relationship from the corresponding signaling.

In operation S303, sending uplink HARQ feedback information of the downlink data to the base station in a corresponding time domain unit according to the timing relationship and the time domain unit where the downlink data is configured.

Where when the control information is radio resource control RRC signaling, media access control MAC control element CE or physical layer signaling, and the timing relationship is one value, the terminal may send uplink HARQ feedback information of the downlink data to the base station in one corresponding time domain unit according to the timing relationship and the time domain unit where the downlink data is configured.

Figure 4:
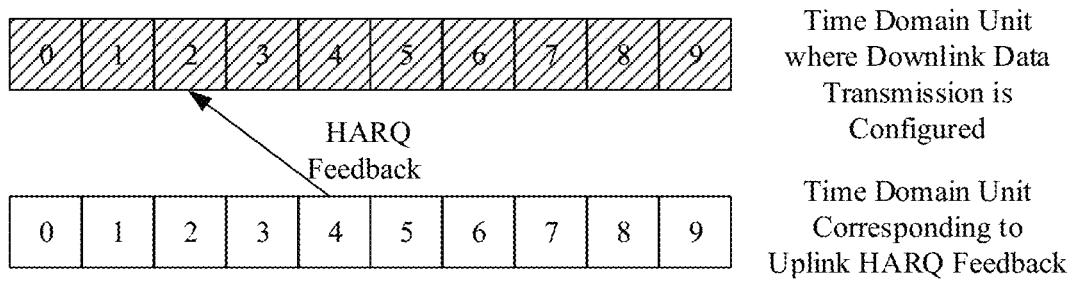
FIG. 4 is a first schematic diagram of a timing relationship between a time domain unit where the downlink data is configured and a time domain unit of uplink HARQ feedback according to an exemplary embodiment of the present application.

For example, as shown in FIG. 4, the terminal performs downlink data transmission on symbol 2. Assuming that the timing relationship is 2 symbols, the uplink HARQ feedback for the downlink data is transmitted on symbol 4.

Where when the control information is RRC signaling, MAC CE, or physical layer signaling, and the timing relationship is a plurality of values, the terminal may send uplink HARQ feedback information of the downlink data to the base station in the corresponding multiple time domain units respectively according to the timing relationship and the time domain unit where the downlink data is configured.

Figure 5:
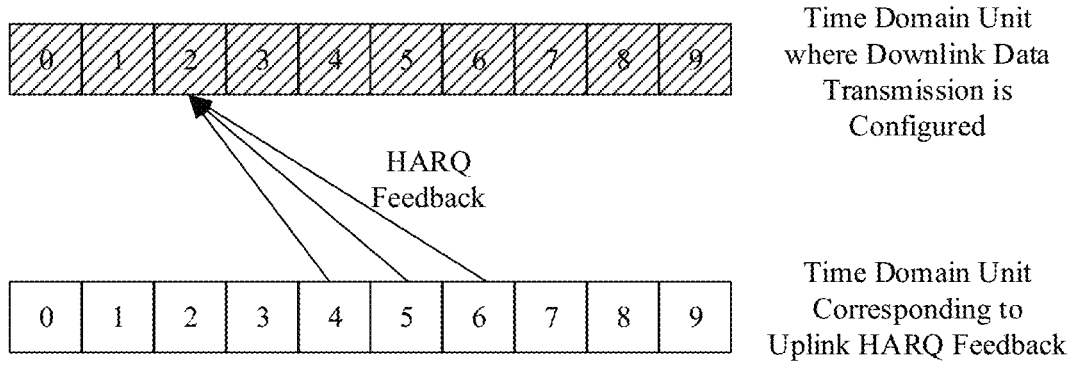
FIG. 5 is a second schematic diagram of a timing relationship between a time domain unit where the downlink data is configured and a time domain unit of uplink HARQ feedback thereof according to an exemplary embodiment of the present application.

For example, as shown in FIG. 5, the terminal performs downlink data transmission on symbol 2. Assuming that the timing relationship is 2 symbols, 3 symbols and 4 symbols, the uplink HARQ feedback for the downlink data is transmitted on symbol 4, symbol 5 and symbol 6.

In the above described embodiments, through receiving downlink data sent by a base station and control information configured with a timing relationship between the time domain unit where the downlink data is configured and the time domain unit of the uplink HARQ feedback of the downlink data sent by the base station, parsing the timing relationship from the control information, and sending uplink HARQ feedback information of the downlink data to the base station in a corresponding time domain unit according to the timing relationship and the time domain unit where the downlink data is configured, thereby a dynamic HARQ feedback is implemented.

Figure 6:
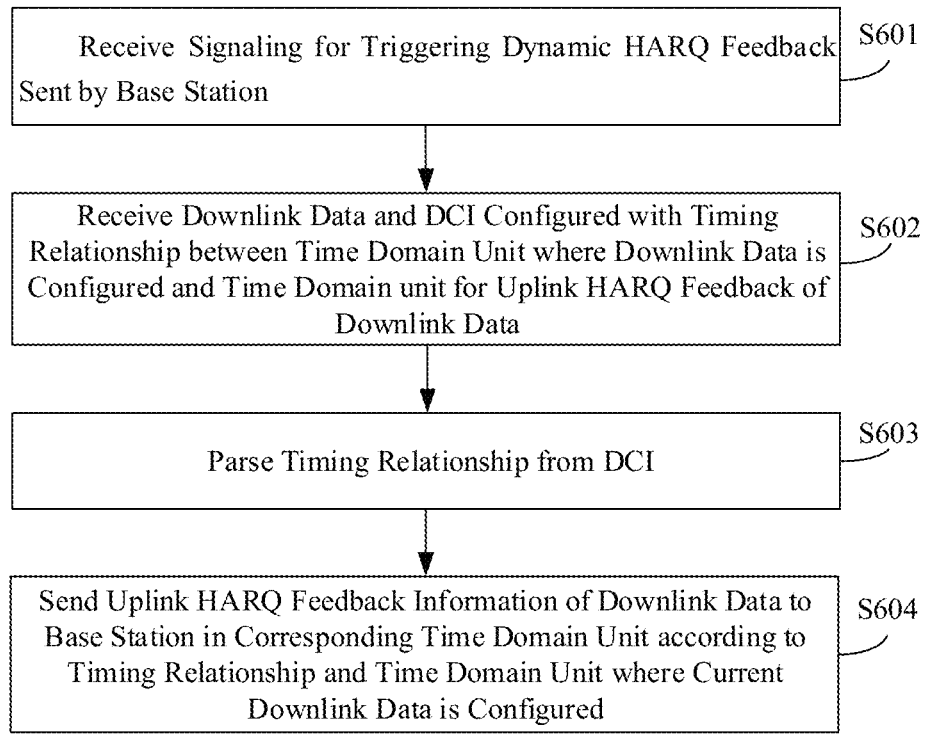
FIG. 6 is a flowchart of another HARQ feedback method according to an exemplary embodiment of the present application.

FIG. 6 is a flowchart of another HARQ feedback method according to an exemplary embodiment of the present application. The embodiment is described from a terminal side. As shown in FIG. 6, the HARQ feedback method includes the following.

In operation S601, signaling for triggering dynamic HARQ feedback sent by the base station is received.

Where the signaling for triggering dynamic HARQ feedback may include RRC signaling, MAC CE or physical layer signaling.

A timing relationship between the time domain unit where an initial downlink data of the terminal is configured and the time domain unit of the uplink HARQ feedback of the downlink data is a default value, that is, the terminal has a default timing relationship. The terminal may obtain the default timing relationship in a predefined manner, and may also obtain the default timing relationship from RRC signaling, MAC CE, or physical layer signaling sent by the base station.

In operation S602, downlink data and DCI configured with a timing relationship between a time domain unit where downlink data is configured and a time domain unit for an uplink HARQ feedback of the downlink data are received.

In operation S603, the timing relationship from the DCI is parsed.

In operation S604, uplink HARQ feedback information of the downlink data is sent to the base station in a corresponding time domain unit according to the timing relationship and the time domain unit where the downlink data is configured.

After receiving the signaling for triggering dynamic HARQ feedback sent by the base station, the terminal may parse the timing relationship from the received DCI, and perform a feedback on the received downlink data in the corresponding time domain unit.

In addition, before the received signaling for triggering dynamic HARQ feedback takes effective, the terminal may obtain a default timing relationship, and send uplink HARQ feedback information of the downlink data to the base station in a corresponding time domain unit according to the default timing relationship and the time domain unit where the downlink data is configured.

In the above described embodiments, through receiving sent by the base station signaling for triggering dynamic HARQ feedback, parsing the timing relationship from the DCI according to the signaling, and sending uplink HARQ feedback information to the base station in the corresponding time domain unit according to the timing relationship, thereby a dynamic HARQ feedback is implemented.

Figure 7:
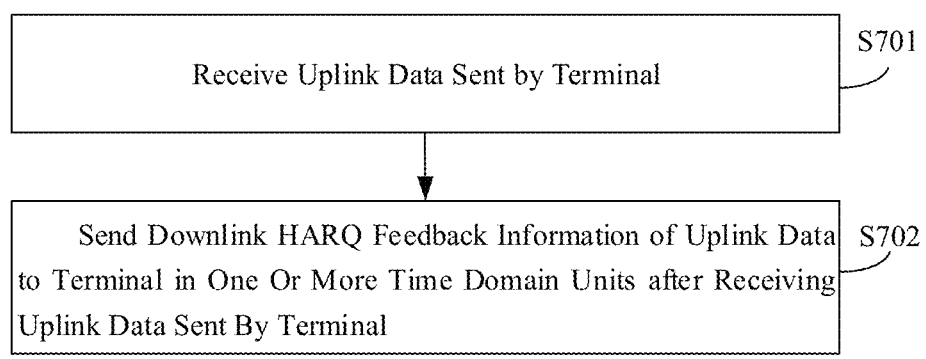
FIG. 7 is a flowchart of another HARQ feedback method according to an exemplary embodiment of the present application.

FIG. 7 is a flowchart of another HARQ feedback method according to an exemplary embodiment of the present application. This embodiment is described from the base station side. The embodiment describes the HARQ feedback method by using a downlink feedback of uplink data as an example. As shown in FIG. 7, the HARQ feedback method includes the following.

In operation S701, uplink data sent by a terminal is received.

In operation S702, downlink HARQ feedback information of the uplink data is sent to the terminal in one or more time domain units after receiving the uplink data sent by the terminal.

In this embodiment, after receiving the uplink data sent by the terminal, the base station may send the downlink HARQ feedback information of the uplink data to the terminal in some or certain time domain units after receiving the uplink data sent by the terminal. The downlink HARQ feedback information may be carried on a physical downlink control channel (PDCCH) or a newly defined channel for carrying feedback information, and the PDCCH or the newly defined channel for carrying feedback information may also implicitly or explicitly include identification information containing the uplink data targeted by the downlink feedback information. Preferably, the PDCCH includes downlink feedback information for uplink data of a plurality of terminals. After receiving the downlink HARQ feedback information of the uplink data, the terminal may decide whether to re-send the uplink data according to the HARQ feedback information.

In the above described embodiments, through having received the uplink data sent by the terminal, and sending downlink HARQ feedback information of the uplink data to the terminal in one or more time domain units after receiving the uplink data sent by the terminal, the terminal is supported to achieve a dynamic HARQ feedback.

Figure 8A:
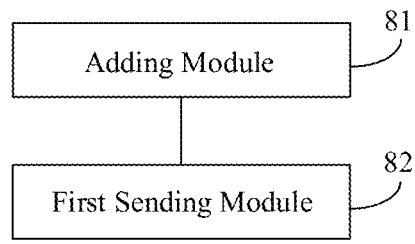
FIG. 8A is a block diagram of a HARQ feedback indication apparatus according to an exemplary embodiment.

FIG. 8A is a block diagram of a HARQ feedback indication apparatus according to an exemplary embodiment, and the apparatus may be located in a base station. As shown in FIG. 8A, the apparatus includes: an adding module 81 and a first sending module 82.

The adding module 81 is configured to configure a timing relationship between the time domain unit where downlink data is configured and a time domain unit for an uplink HARQ feedback of the downlink data to control information.

Where the control information may include, but is not limited to, downlink control information (DCI), radio resource control (RRC) signaling, media access control (MAC) control element (CE), or physical layer signaling and the like.

When the control information is DCI, the above timing relationship may be configured in an information domain of the DCI, and the information domain may be configured at a fixed location or a configurable location in the DCI Moreover, a length of the information domain may be fixed, or may also be pre-determined with the terminal, and still also may be configurable. If the length of the information domain is configurable, the base station may notify the terminal of the length of the information domain via RRC signaling, MAC CE or physical layer signaling.

When the control information is signaling, the signaling may include RRC signaling, MAC CE or physical layer signaling. At this time, the timing relationship may be one value, for example, two symbols or four symbols, and may also be multiple values, for example, two symbols, three symbols and four symbols.

The first sending module 82 is configured to send the downlink data and control information configured with the timing relationship by the adding module 81 to the terminal.

In this embodiment, after configuring the timing relationship to the control information, the downlink data and the control information configured with the above timing information may be sent to the terminal. After receiving the control information, the terminal may send uplink HARQ feedback information of the downlink data to the base station in a corresponding time domain unit according to the timing relationship and the time domain unit where the downlink data is configured, so as to implement a dynamic HARQ feedback.

In the above described embodiments, through that the timing relationship between the time domain unit where the downlink data is configured and the time domain unit of the uplink HARQ feedback of the downlink data is configured in the control information, and the downlink data and the control information configured with timing information is sent to the terminal, the terminal may send uplink HARQ feedback information of the downlink data to the base station according to the timing relationship, thereby implementing a dynamic HARQ feedback.

Figure 8B:
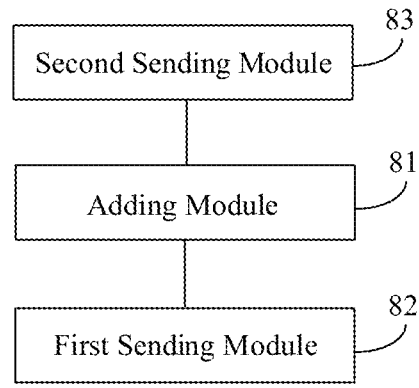
FIG. 8B is a block diagram of another HARQ feedback indication apparatus according to an exemplary embodiment.

FIG. 8B is a block diagram of another HARQ feedback indication apparatus according to an exemplary embodiment. As shown in FIG. 8B, based on the embodiments shown in FIG. 8A, the apparatus may further include a second sending module 83.

The second sending module 83 is configured to send signaling for triggering dynamic HARQ feedback to the terminal.

Where the signaling for triggering dynamic HARQ feedback may include RRC signaling, MAC CE or physical layer signaling.

In the embodiment, there are a plurality of trigger conditions on which the base station sends signaling to the terminal for triggering dynamic HARQ feedback For example, the base station has detected that the service was switched to a preset type service. For another example, the base station receives the service information reported by the terminal, and determines that the service is switched to a preset type service according to the service information, where the preset type service may include, but are not limited to, low-latency service.

It should be noted that the trigger conditions listed above are only examples. In actual applications, there may also be other trigger conditions.

In the above described embodiments, through sending signaling for triggering dynamic HARQ feedback to the terminal and sending the downlink data and DCI configured with timing information to the terminal, the terminal may trigger dynamic HARQ feedback based on the signaling.

Figure 9A:
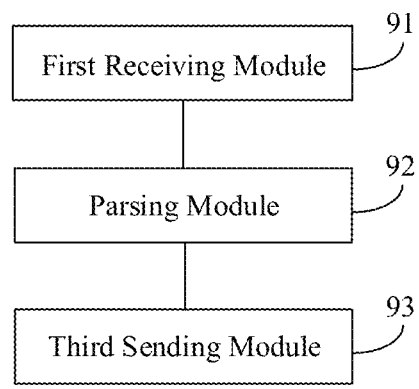
FIG. 9A is a block diagram of a HARQ feedback apparatus according to an exemplary embodiment.

FIG. 9A is a block diagram of a HARQ feedback apparatus according to an exemplary embodiment, and the apparatus may be configured in a terminal. As shown in FIG. 9A, the apparatus includes a first receiving module 91, a parsing module 92, and a third sending module 93.

The first receiving module 91 is configured to receive downlink data sent by a base station and control information configured with a timing relationship between a time domain unit where the downlink data is configured and a time domain unit for an uplink HARQ feedback of the downlink data sent by the base station.

Where, the control information may include, but is not limited to, downlink control information (DCI), radio resource control (RRC) signaling, media access control (MAC) control element (CE), or physical layer signaling and the like.

The parsing module 92 is configured to parse the timing relationship from the control information received by the first receiving module 91.

When the control information is DCI, the timing relationship is configured in an information domain of the DCI, and the information domain is in a fixed or configurable location in the DCI, and the length of the information domain is fixed or configurable, the terminal may detect the information domain of the fixed length or the configurable length at the fixed location in the DCI, to obtain the timing relationship.

When the control information is RRC signaling, MAC CE or physical layer signaling, the terminal may parse the timing relationship from the corresponding signaling.

The third sending module 93 is configured to send uplink HARQ feedback information of the downlink data to the base station in a corresponding time domain unit according to the timing relationship parsed by the parsing module 92 and time domain unit where the downlink data is configured.

Where, when the control information is radio resource control RRC signaling, media access control MAC control element CE or physical layer signaling, and the timing relationship is one value, the third sending module 93 may send uplink HARQ feedback information of the downlink data to the base station in one corresponding time domain unit according to the timing relationship and the time domain unit where the downlink data is configured.

For example, as shown in FIG. 4, the terminal performs downlink data transmission on symbol 2. Assuming that the timing relationship is 2 symbols, the uplink HARQ feedback for the downlink data is transmitted on symbol 4.

Where when the control information is RRC signaling, MAC CE, or physical layer signaling, and the timing relationship is a plurality of values, the third sending module 93 may send uplink HARQ feedback information of the downlink data to the base station in the corresponding multiple time domain units respectively according to the timing relationship and the time domain unit where the downlink data is configured.

For example, as shown in FIG. 5, the terminal performs downlink data transmission on symbol 2. Assuming that the timing relationship is 2 symbols, 3 symbols and 4 symbols, the uplink HARQ feedback for the downlink data is transmitted on symbol 4, symbol 5 and symbol 6.

In the above described embodiments, through receiving downlink data sent by a base station and control information configured with a timing relationship between the time domain unit where the downlink data is configured and the time domain unit of the uplink HARQ feedback of the downlink data sent by the base station, parsing the timing relationship from the control information, and sending uplink HARQ feedback information of the downlink data to the base station in a corresponding time domain unit according to the timing relationship and the time domain unit where the downlink data is configured, thereby a dynamic HARQ feedback is implemented.

Figure 9B:
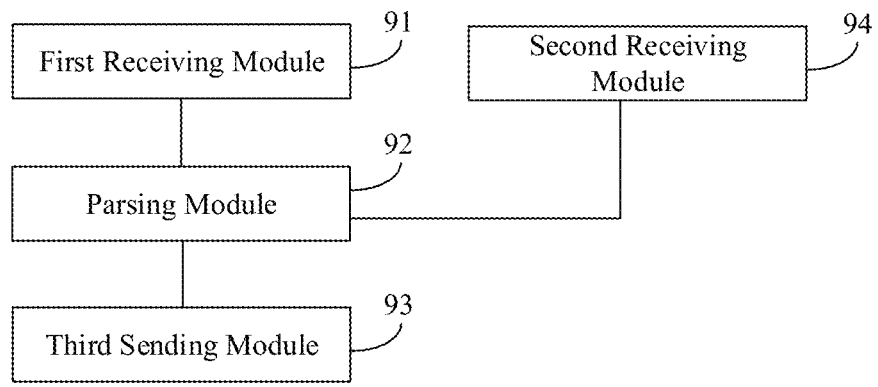
FIG. 9B is a block diagram of another HARQ feedback apparatus according to an exemplary embodiment.

FIG. 9B is a block diagram of another HARQ feedback apparatus according to an exemplary embodiment. As shown in FIG. 9B, based on the embodiments shown in FIG. 9A, the apparatus may further include a second receiving module 94.

The second receiving module 94 is configured to receive signaling for triggering dynamic HARQ feedback sent by the base station before the parsing module 92 parses the timing relationship from the control information.

Where the signaling for triggering dynamic HARQ feedback may include RRC signaling, MAC CE or physical layer signaling.

In the above described embodiments, through receiving signaling for triggering dynamic HARQ feedback sent by the base station, parsing the timing relationship from the DCI according to the signaling, and sending uplink HARQ feedback information to the base station in a corresponding time domain unit according to the timing relationship, thereby a dynamic HARQ feedback is implemented.

Figure 9C:
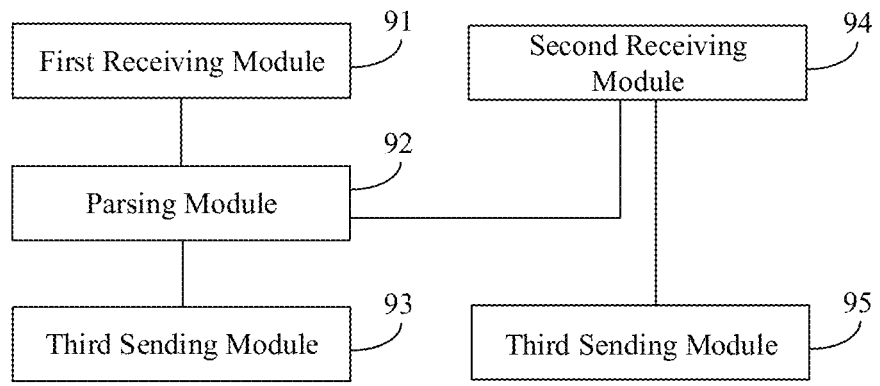
FIG. 9C is a block diagram of another HARQ feedback apparatus according to an exemplary embodiment.

FIG. 9C is a block diagram of another HARQ feedback apparatus according to an exemplary embodiment. As shown in FIG. 9C, based on the embodiment shown in FIG. 9B, the apparatus may further include: an obtaining and sending module 95.

The obtaining and sending module 95 is configured to obtain a default timing relationship before the signaling received by the second receiving module 94 for triggering dynamic HARQ feedback takes effective, and send the uplink HARQ feedback information of the downlink data to the base station in a corresponding time domain unit according to the default timing relationship and the time domain unit where the downlink data is configured.

A timing relationship between the time domain unit where an initial downlink data of the terminal is configured and the time domain unit of the uplink HARQ feedback of the downlink data is a default value, that is, the terminal has a default timing relationship.

Before the received signaling for triggering dynamic HARQ feedback takes effective, the terminal may obtain a default timing relationship, and send uplink HARQ feedback information of the downlink data to the base station in a corresponding time domain unit according to the default timing relationship and the time domain unit where the downlink data is configured.

In the above described embodiments, before the received signaling for triggering dynamic HARQ feedback takes effective, a default timing relationship may be obtained, and the uplink HARQ feedback information of the downlink data is sent to the base station in a corresponding time domain unit according to the default timing relationship and the time domain unit where the downlink data is configured, thereby implementing an uplink HARQ feedback on the downlink data.

Figure 10:
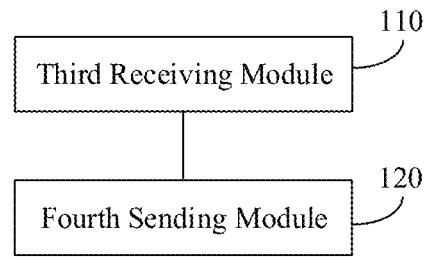
FIG. 10 is a block diagram of another HARQ feedback apparatus according to an exemplary embodiment.

FIG. 10 is a block diagram illustrating another HARQ feedback apparatus according to an exemplary embodiment, and the apparatus may be located in a base station. As shown in FIG. 10, the apparatus includes a third receiving module 110 and a fourth sending module 120.

The third receiving module 110 is configured to receive uplink data sent by a terminal.

The fourth sending module 120 is configured to send downlink HARQ feedback information of the uplink data received by the third receiving module 110 to the terminal in one or more time domain units next to a unit for receiving the uplink data sent by the terminal.

In the embodiment, after receiving the uplink data sent by the terminal, the base station may send the downlink HARQ feedback information of the uplink data to the terminal in some or certain time domain units after receiving the uplink data sent by the terminal. The downlink HARQ feedback information may be carried on a physical downlink control channel (PDCCH) or a newly defined channel for carrying feedback information, and the PDCCH or the newly defined channel for carrying feedback information may also implicitly or explicitly include identification information containing the uplink data targeted by the downlink feedback information. Preferably, the PDCCH includes downlink feedback information for uplink data of a plurality of terminals. After receiving the downlink HARQ feedback information of the uplink data, the terminal may decide whether to re-send the uplink data according to the HARQ feedback information.

In the above described embodiments, through having received the uplink data sent by the terminal, and sending downlink HARQ feedback information of the uplink data to the terminal in one or more time domain units after receiving the uplink data sent by the terminal, the terminal is supported to achieve a dynamic HARQ feedback.

Figure 11:
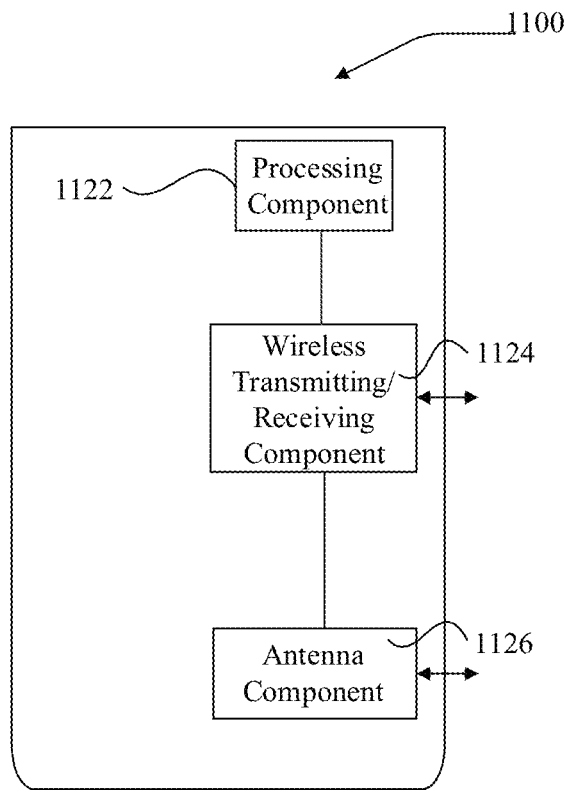
FIG. 11 is a block diagram applied to a HARQ feedback indication apparatus according to an exemplary embodiment.

FIG. 11 is another block diagram applied to a HARQ feedback indication apparatus according to an exemplary embodiment. The apparatus 1100 may be provided as a base station. Referring to FIG. 11, the apparatus 1100 includes a processing component 1122, a wireless transmitting/receiving component 1124, an antenna component 1126, and a signal processing portion unique to a wireless interface. The processing component 1122 may further include one or more processors.

One of the processors from the processing component 1122 may be configured to:

configure a timing relationship between the time domain unit where downlink data is configured and a time domain unit for an uplink HARQ feedback of the downlink data in control information; and send downlink data and control information configured with timing information to the terminal.

In exemplary embodiments, there is also provided a non-transitory computer-readable storage medium including instructions, the above described instructions may be executed by the processing component 1122 of the apparatus 1100 to complete the above-mentioned Hybrid Automatic Repeat reQuest HARQ feedback indication method. For example, the non-transitory computer-readable storage medium may be a ROM, a random access memory (RAM), a CD-ROM, a magnetic tape, a floppy disk and an optical data storage apparatus and the like.

Figure 12:
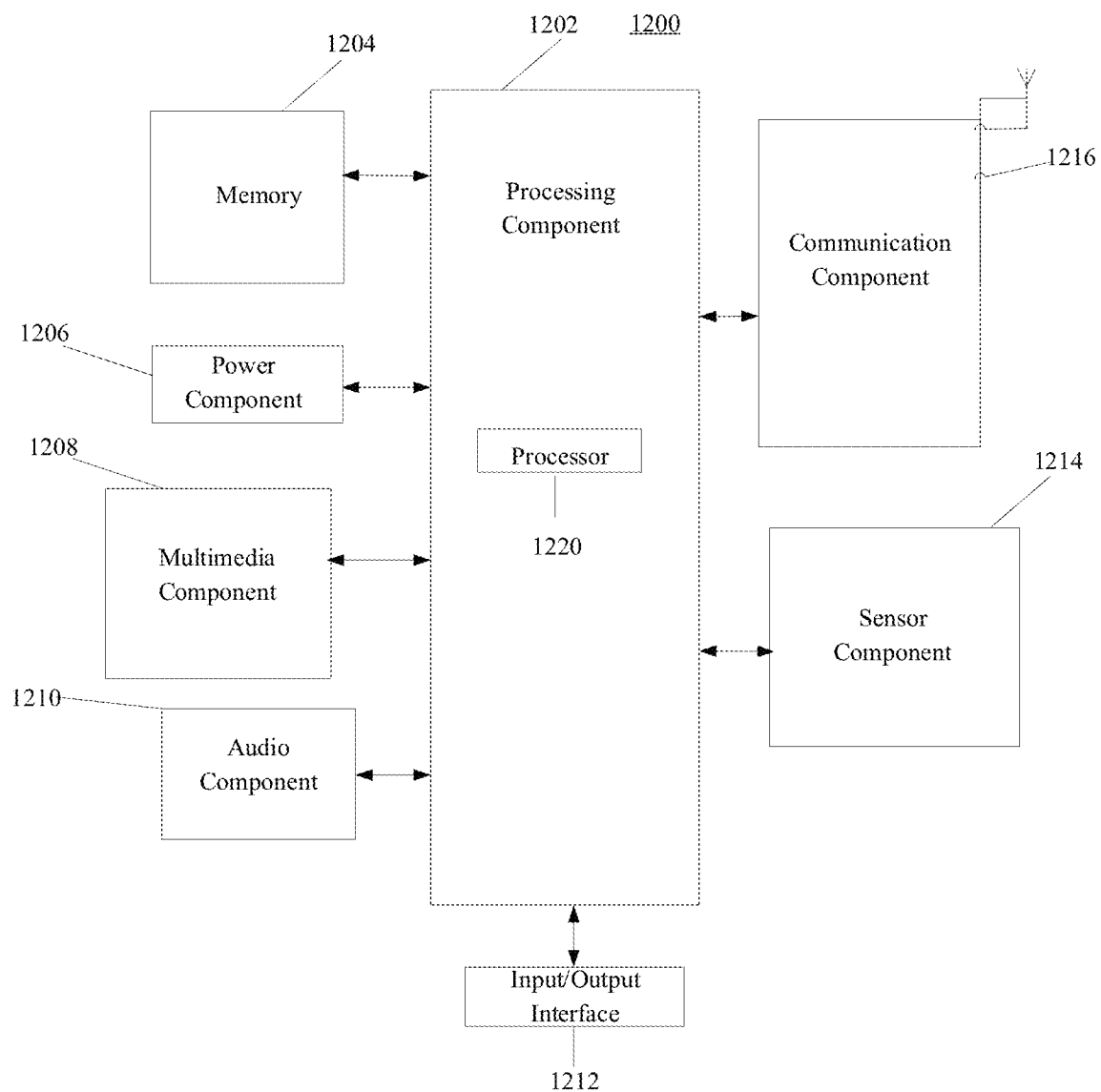
FIG. 12 is a block diagram applied to a HARQ feedback apparatus according to an exemplary embodiment.

FIG. 12 is a block diagram applied to a HARQ feedback apparatus according to an exemplary embodiment. For example, the apparatus 1200 may be a user equipment such as a mobile phone, a computer, a digital broadcasting terminal, a message receiving and sending device, a game console, a tablet device, a medical device, a fitness device, a personal digital assistant and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214 and a communication component 1216.

The processing component 1201 typically controls overall operations of the apparatus 1200, such as the operations associated with displays, telephone calls, data communication, camera operations and recording operations. The processing component 1202 may include one or more processors 1220 to execute instructions to perform all or part of the operations in the above described methods. Moreover, the processing component 1202 may include one or more modules which facilitate the interaction between the processing component 1202 and other components. For instance, the processing component 1202 may include a multimedia module to facilitate interactions between the multimedia component 1208 and the processing component 1202.

One of the processors 1220 from the processing component 1202 may be configured to:

receive downlink data sent by a base station and control information configured with a timing relationship between a time domain unit where the downlink data is configured and a time domain unit for an uplink HARQ feedback of the downlink data;

parse the timing relationship from the control information; and send, according to the timing relationship and the time domain unit where the downlink data is configured, uplink HARQ feedback information of the downlink data to the base station in a corresponding time domain unit.

The memory 1204 is configured to store various types of data to support operations on the apparatus 1200. Examples of such data include instructions, contact data, phonebook data, messages, pictures, videos and the like for any applications or methods operated on the apparatus 1200. The memory 1204 may be implemented by using any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory and a magnetic or optical disk.

The power component 1206 provides power to various components of the apparatus 1200. The power component 1206 may include a power management system, one or more power sources and any other components associated with generation, management and distribution of power for the apparatus 1200.

The multimedia component 1208 includes a screen providing an output interface between the apparatus 1200 and a user. In some embodiments, the screen may include a Liquid Crystal Display (LCD) and a Touch Panel (TP). If the screen includes a touch panel, the screen may be implemented as a touch screen, to receive input signals from the user. The touch panel includes one or more touch sensors to sense touches, slips and gestures on the touch panel. The touch sensors may not only sense a boundary of a touch or slip action, but also detect duration and a pressure associated with the touch or the slip action. In some embodiments, the multimedia component 1208 includes a front camera and/or a rear camera. The front camera and the rear camera may receive external multimedia data when the apparatus 1200 is in an operation mode, such as a photographing mode or a video mode. Each of the front camera and the rear camera may be a fixed optical lens system or have focus and an optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode or a voice recognition mode. The received audio signal may be further stored in the memory 1204 or transmitted via the communication component 1216. In some embodiments, the audio component 1210 further includes a speaker, to output audio signals.

The I/O interface 1212 provides an interface between the processing component 1202 and peripheral interface modules, and the above peripheral interface modules may be such as a keyboard, a click wheel, buttons and the like. These buttons may include, but are not limited to, a home button, a volume button, a starting button and a locking button.

The sensor component 1214 includes one or more sensors used to provide status assessments of various aspects for the apparatus 1200. For instance, the sensor component 1214 may detect an open/closed status of the apparatus 1200, relative positioning of components, e.g., the components may be a display and a keypad of the apparatus 1200; the sensor component 1214 may also detect a change in position of the apparatus 1200 or a component of the apparatus 1200, presence or absence of user contact with the apparatus 1200, an orientation or an acceleration/deceleration of the apparatus 1200 and a change in temperature of the apparatus 1200. The sensor component 1214 may include a proximity sensor configured to detect presence of nearby objects without any physical contact. The sensor component 1214 may further include a light sensor, such as a CMOS or CCD image sensor for use in imaging applications. In some embodiments, the sensor component 1214 may further include an accelerometer sensor, a gyroscope sensor, a magnetic sensor, a pressure sensor or a temperature sensor.

The communication component 1216 is configured to facilitate communication, wired or wirelessly, between the apparatus 1200 and other apparatuses. The apparatus 1200 may access a wireless network based on a communication standard, such as WiFi, 2G, 3G, 4G or 5G, or a combination thereof. In one exemplary embodiment, the communication component 1216 receives a broadcast signal or broadcast-associated information from an external broadcast management system via a broadcast channel. In one exemplary embodiment, the communication component 1216 further includes a Near Field Communication (NFC) module, to facilitate short-range communications. For example, the NFC module may be implemented based on Radio Frequency Identification (RFID) technology, Infrared Data Association (IrDA) technology, Ultra-Wideband (UWB) technology, Bluetooth (BT) technology and other technologies.

In exemplary embodiments, the apparatus 1200 may be realized with one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, micro-controllers, micro-processors or other electronic components, for performing above-mentioned method.

In exemplary embodiments, there is also provided a non-transitory computer-readable storage medium including instructions, for example, a memory 1204 including instructions, and the above instructions may be executed by the processor 1220 of the apparatus 1200 to perform the above-described method. For example, the non-transitory computer-readable storage medium may be a ROM, a Random Access Memory (RAM), a CD-ROM, a magnetic tape, a floppy disk and an optical data storage device and the like.

Figure 13:
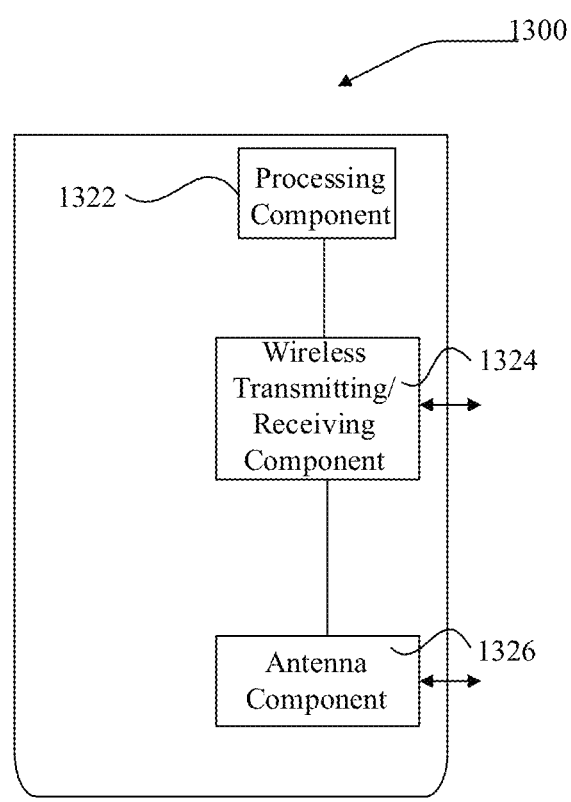
FIG. 13 is another block diagram applied to a HARQ feedback apparatus according to an exemplary embodiment.

FIG. 13 is a block diagram applied to a HARQ feedback apparatus according to an exemplary embodiment, the apparatus 1300 may be provided as a base station. Refer to FIG. 13, the apparatus 1300 includes a processing component 1322, a wireless transmitting/receiving component 1324, an antenna component 1326, and a signal processing portion unique to a wireless interface. The processing component 1322 may further include one or more processors.

One of the processors in processing component 1322 may be configured to:
receive the uplink data sent by a terminal; and
send downlink HARQ feedback information of the uplink data to the terminal in one or more time domain units next to a unit for receiving the uplink data sent by the terminal.

In exemplary embodiments, there is also provided a non-transitory computer-readable storage medium including instructions, and the above described instructions may be executed by the processing component 1322 of the apparatus 1300 to complete the above-mentioned Hybrid Automatic Repeat reQuest HARQ feedback method. For example, the non-transitory computer-readable storage medium may be a ROM, a Random Access Memory (RAM), a CD-ROM, a magnetic tape, a floppy disk and an optical data storage device and the like.

As for the apparatus embodiments, because they basically correspond to the method embodiments, the relevant parts may refer to the descriptions of the method embodiments. The apparatus embodiments described above are only schematic, and the units described as separate components may or may not be physically separated, the components displayed as units may or may not be physical units, that is, may be located in one place, or may be distributed in multiple network units. A part or all of the modules may be selected according actual needs to achieve objectives of the solutions of these embodiments. Those of ordinary skill in the art may understand and implement without creative efforts.

It should be noted that in this article, relational terms such as the first and the second are only used to distinguish one entity or operation from another entity or operation, and do not necessarily require or imply any such actual relationship or order between these entities or operations. The term "comprise", "include" or any other variations thereof is intended to encompass non-exclusive inclusion, so that a process, a method, an article, or an apparatus that includes a set of elements includes not only those elements, but also other elements that are not explicitly listed, or may include elements that are inherent to such a process, a method, an article or an apparatus. Without more restrictions, the elements defined by a statement "include a . . . " do not exclude the existence of other identical elements in the process, method, article or apparatus including the elements.

Those skilled in the art will easily contemplate other embodiments of the present disclosure after considering the specification and practicing the disclosure disclosed herein. This application is intended to cover any variations, uses, or adaptive changes of this disclosure, and these variations, uses, or adaptive changes follow the general principles of the present disclosure and include common general knowledge or conventional technical means in the technical field not disclosed in the present disclosure. The specification and examples are deemed as exemplary only, with a true scope and spirit of the disclosure being indicated by the following claims.

It should be understood that the present disclosure is not limited to the precise structures that have been described above and illustrated in the drawings, and various modifications and changes may be made without departing from the scope thereof. The scope of the disclosure is limited only by the following claims.

What is claimed is:

1. A hybrid automatic repeat request (HARQ) feedback indication method, applied to a base station, the method comprising:
sending signaling for triggering dynamic HARQ feedback to a terminal;
configuring, in control information, a timing relationship between a first time domain unit where downlink data is configured and a second time domain unit for an uplink HARQ feedback of the downlink data, wherein the control information comprises downlink control information (DCI), the signaling for triggering dynamic HARQ feedback comprises RRC signaling or media access control (MAC) control element (CE); and
sending the downlink data and the control information configured with the timing relationship to the terminal;

wherein the timing relationship is configured in an information domain of the DCI, the information domain is configured at a fixed location or a configurable location in the DCI, and a length of the information domain is fixed or configurable.

2. The method according to claim 1, wherein the control information comprises radio resource control (RRC) signaling, MAC CE, or physical layer signaling, and the timing relationship comprises one or more values.

3. A hybrid automatic repeat request (HARQ) feedback method, applied to a terminal, the method comprising:
receiving signaling for triggering dynamic HARQ feedback sent by a base station;
receiving downlink data sent by the base station and control information configured with a timing relationship between a first time domain unit where the downlink data is configured and a second time domain unit for an uplink HARQ feedback of the downlink data sent by the base station, wherein the control information comprises downlink control information (DCI), the signaling for triggering dynamic HARQ feedback comprises RRC signaling or media access control (MAC) control element (CE);
parsing the timing relationship from the control information; and
sending, according to the timing relationship and the first time domain unit where the downlink data is configured, uplink HARQ feedback information of the downlink data to the base station in a corresponding time domain unit;
wherein the timing relationship is configured in an information domain of the DCI, the information domain is configured at a fixed location or a configurable location in the DCI, and a length of the information domain is fixed or configurable.

4. The method according to claim 3, wherein the parsing the timing relationship from the control information comprises:
detecting an information domain of a fixed length or a configurable length at the fixed location of the DCI, to obtain the timing relationship.

5. The method according to claim 3, wherein the control information comprises radio resource control (RRC) signaling, MAC CE or physical layer signaling, and the timing relationship is one value, the sending, according to the timing relationship and the first time domain unit where the downlink data is configured, the uplink HARQ feedback information of the downlink data to the base station in the corresponding time domain unit comprises:
sending, according to the timing relationship and the first time domain unit where the downlink data is configured, uplink HARQ feedback information of the downlink data to the base station in one corresponding time domain unit; or
the control information is RRC signaling, MAC CE or physical layer signaling, and the timing relationship are a plurality of values, the sending, according to the timing relationship and the first time domain unit where the downlink data is configured, the uplink HARQ feedback information of the downlink data to the base station in the corresponding time domain unit comprises:

sending, according to the timing relationship and the first time domain unit where the downlink data is configured, uplink HARQ feedback information of the downlink data to the base station in corresponding multiple time domain units, respectively.

6. The method according to claim 3, wherein the method further comprises:
before the received signaling for triggering dynamic HARQ feedback takes effect, obtaining a default timing relationship and sending the uplink HARQ feedback information of the downlink data to the base station in a corresponding time domain unit according to the default timing relationship and the time domain unit where the downlink data is configured.

7. The method according to claim 1, wherein the method further comprises:
receiving uplink data sent by a terminal; and
sending downlink HARQ feedback information of the uplink data to the terminal in one or more time domain units next to a unit for receiving the uplink data sent by the terminal.

8. A base station, comprising:
a processor; and
a memory for storing instructions executable by the processor, wherein the processor is configured to perform operations of the HARQ feedback indication method according to claim 1.

9. The base station according to claim 8, wherein the control information comprises radio resource control (RRC) signaling, MAC CE, or physical layer signaling, and the timing relationship comprises one or more values.

10. A user equipment, comprising:
a processor; and
a memory for storing instructions executable by the processor, wherein the processor is configured to perform operations of the HARQ feedback method according to claim 3.

11. The user equipment according to claim 10, wherein the processor is further configured to:
detect an information domain of a fixed length or a configurable length at the fixed location of the DCI, to obtain the timing relationship.

12. The user equipment according to claim 10, wherein the control information comprises radio resource control (RRC) signaling, MAC CE or physical layer signaling, the timing relationship is one value, and the processor is further configured to send, according to the timing relationship and the time domain unit where the downlink data is configured, uplink HARQ feedback information of the downlink data to the base station in one corresponding time domain unit; or
the control information is RRC signaling, MAC CE or physical layer signaling, the timing relationship are a plurality of values, and the processor is further configured to send, according to the timing relationship and the time domain unit where the downlink data is configured, uplink HARQ feedback information of the downlink data to the base station in corresponding multiple time domain units respectively.

* * * * *